March 5, 1968 V. T. STACK, JR 3,372,103
DISSOLVED OXYGEN PROBE
Filed Nov. 3, 1964 3 Sheets-Sheet 1
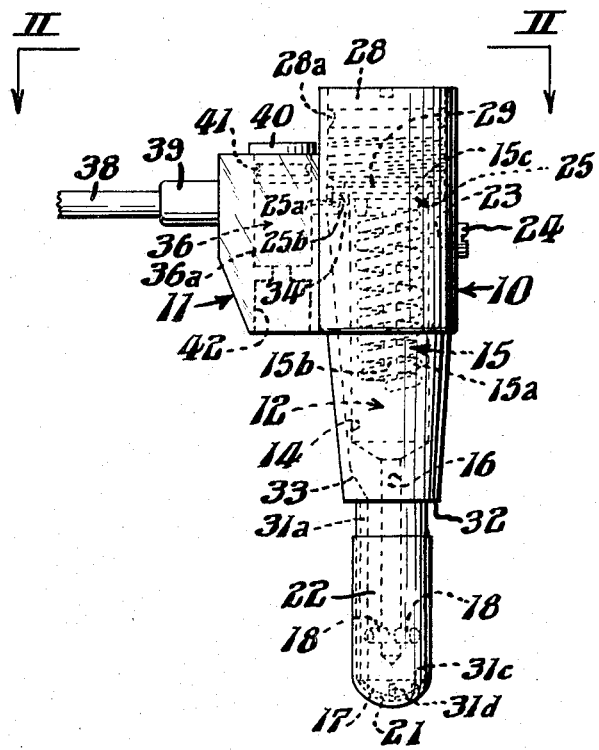
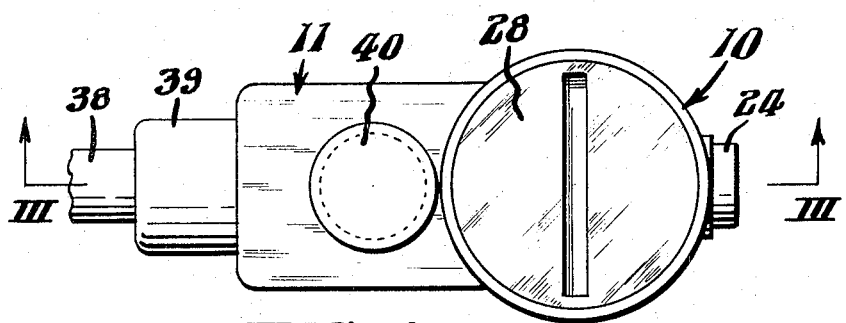
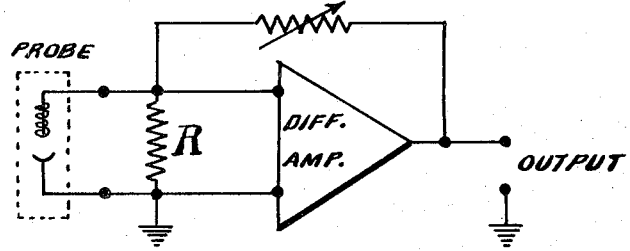
INVENTOR.
Vernon T. Stack, Jr.
BY
Paul & Paul
ATTORNEYS.

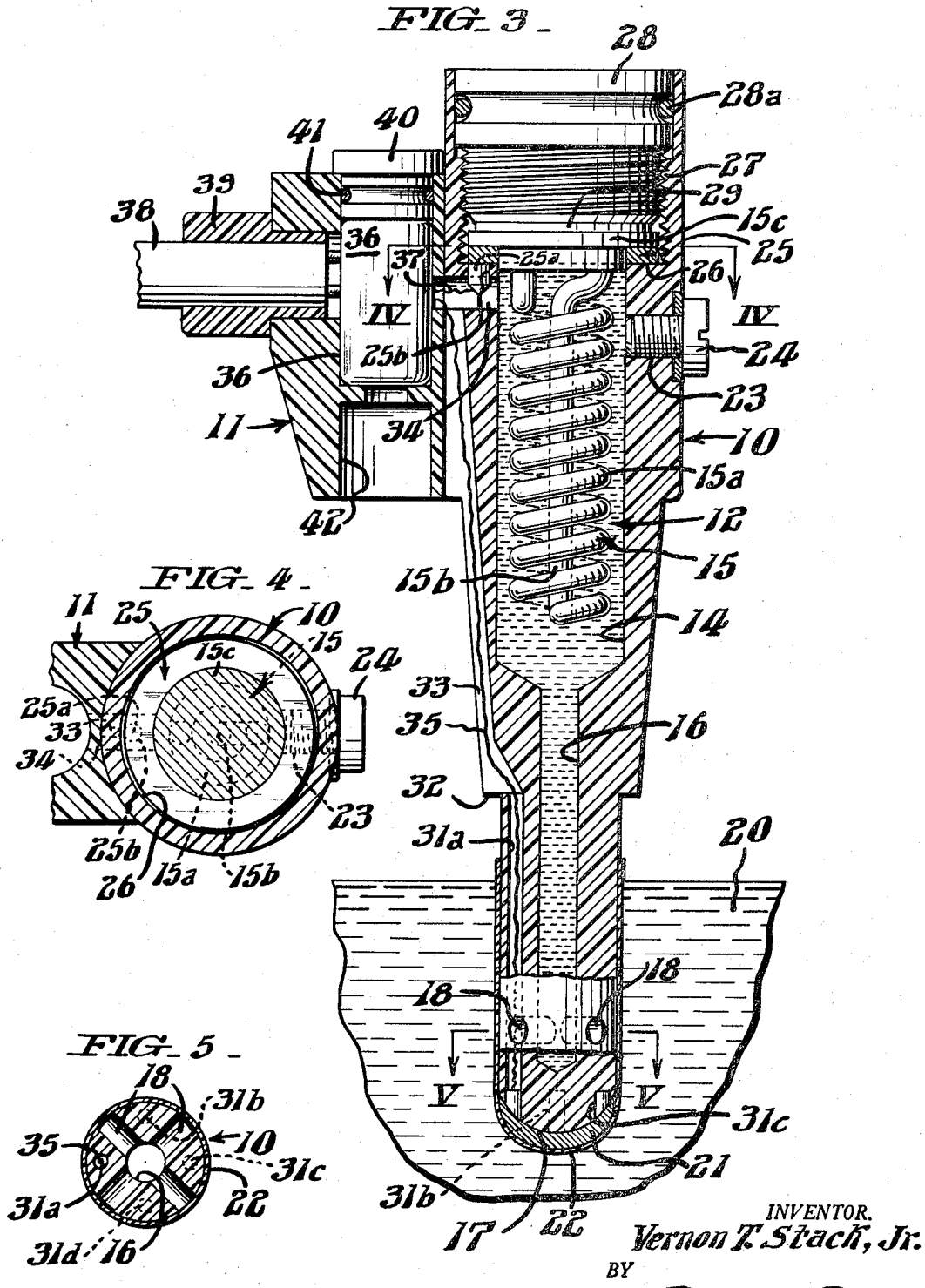

March 5, 1968   V. T. STACK, JR   3,372,103
DISSOLVED OXYGEN PROBE
Filed Nov. 3, 1964   3 Sheets-Sheet 3

\* Rate of decrease in probe output when agitation of sample was stopped demonstrating sensitivity to turbulence INVENTOR.
*Vernon T. Stack, Jr.*
BY *Paul & Paul*
ATTORNEYS.

United States Patent Office 3,372,103
Patented Mar. 5, 1968

3,372,103
DISSOLVED OXYGEN PROBE
Vernon T. Stack, Jr., Chadds Ford, Pa., assignor to Roy F. Weston, Inc., Newtown Square, Pa., a corporation of Pennsylvania
Filed Nov. 3, 1964, Ser. No. 408,504
8 Claims. (Cl. 204—195)

ABSTRACT OF THE DISCLOSURE

An electro-chemical cell or probe is disclosed for use in determining the amount of oxygen dissolved in most liquids or gases and particularly in polluted or clear water. The probe has a chemically resistant body, preferably one which can be autoclaved, and a platinum tip which functions as the cathode. The anode is lead in rod or wire form. The electrolyte is preferably potassium iodide. The surface area of the lead anode is large relative to that of the platinum cathode, at least 30 to 1. The surface area of the lead rod in square inches relative to the volume of electrolyte in milliliters in greater than one. The platinum-lead-electrolyte combination of its own developes a potential internally sufficient for the reduction of oxygen to occur in the cell. No external applied potential is required to support the reduction of oxygen in the cell. A plastic membrane, selectively permeable to oxygen and other gases but impervious to the electrolyte and to the other inorganic and organic constituents of the water, covers the platinum tip and extends sufficiently upward to also cover radial passages which communicate with the electrolyte cavity. A temperature-insensitive resistance is connected between the terminals of the lead anode and the platinum cathode across which an output voltage is developed as a function of the oxygen entering the cell through the membrane and reduced therein. The value of the resistance determines the rate of the response of the probe, the amount of physically produced noise, and the sensitivity of the probe to turbulence. Therefore, this resistance should be held constant during operation. The voltage developed across the resistance is applied to the input terminals of an operational amplifier. A negative feedback circuit, having a thermistor therein, is provided between the output and input terminals of the amplifier, for compensating for temperature variations of the output of the probe. Thus, changes in the thermistor with temperature does not effect the load resistance of the probe and does not alter the response of the probe, but does correct for the changes of the probes output with temperature.

The output of the probe is directly proportional to the dissolved oxygen and has a zero output when the dissolved oxygen is zero. Hence, the same probe is usable with the proper analyzer for trace (parts per billion) analysis of oxygen in water or gas streams.

---

This invention relates to an oxygen measuring device. More particularly, the invention relates to a dissolved oxygen probe, i.e. a polarographic cell or device particularly adapted to use in determining the amount of free oxygen dissolved in a liquid, such as water.

A principal object of the present invention is to provide an improved dissolved oxygen probe which has a fast rate of response, provides a stable reading and has a long performance life.

Another object of the invention is to provide a dissolved oxygen probe which has zero output when immersed in a deoxygenated sample, i.e. in a sample which contains zero dissolved oxygen.

Another object is to provide a dissolved oxygen probe which develops a galvanic potential adequate for the polarographic determination of dissolved oxygen without need of applying an external potential.

A further object is to provide a dissolved oxygen probe which, in addition to having the characteristics and features mentioned above, is free of "drum" effect, i.e., free of oscillations in the readout signal when high degrees of turbulence exist at the membrane-sample interface.

A further object of the invention is to provide a dissolved oxygen probe having, in addition to the foregoing characteristics and features, an output response which varies with temperature in a manner such as to be adapted to be compensated by a single thermistor in the electrical readout circuit.

The foregoing and other objects, advantages and features of the present invention are achieved, in a preferred form, by a dissolved oxygen probe which employs a lead anode, a platinum cathode, and a potassium iodide electrolyte. The probe has no output when immersed in a deoxygenated sample, and the galvanic potential of the platinum-lead system is adequate for polarographic determination of dissolved oxygen without application of an external potential. The probe response rate can be as fast as 99 percent in 10 seconds, both upscale and downscale.

In its preferred form in order that the probe may have a reasonably long performance life and good stability, the lead-platinum ratio is at least 30 to 1 and preferably of the order of 40 to 1 or greater, i.e., the surface area of the lead anode is at least 30 to 1 and preferably forty or more times the area of the platinum cathode. Also, in the preferred form, a lead-electrolyte ratio is preferably of the order of one or more, i.e. the area in number of square inches of lead is equal or greater than the number of milliliters of electrolyte.

In the preferred form, the electrolyte is potassium iodide. This electrolyte, in comparison with sch electrolytes as sodium sulfate, potassium chloride, potassium hydroxide, sodium bicarbonate, sodium acid phosphate, and others, was found to have better solubility at cold temperatures, such as at zero degrees centigrade, and was found to have the best response rate and the longest life.

In the drawings:

FIG. 1 is a side elevational illustration of the preferred form of dissolved oxygen probe;

FIG. 2 is a plan view looking down in FIG. 1 along the lines II—II;

FIG. 3 is an enlarged elevational view, in section along the line III—III in FIG. 2, showing the details of the preferred form of probe;

FIG. 4 is a view in cross section looking down along the line IV—IV of FIG. 3;

FIG. 5 is a cross-sectional view looking down along the line V—V of FIG. 3.

FIG. 6 illustrates a suitable readout circuit for the probe, and

Figure 7:
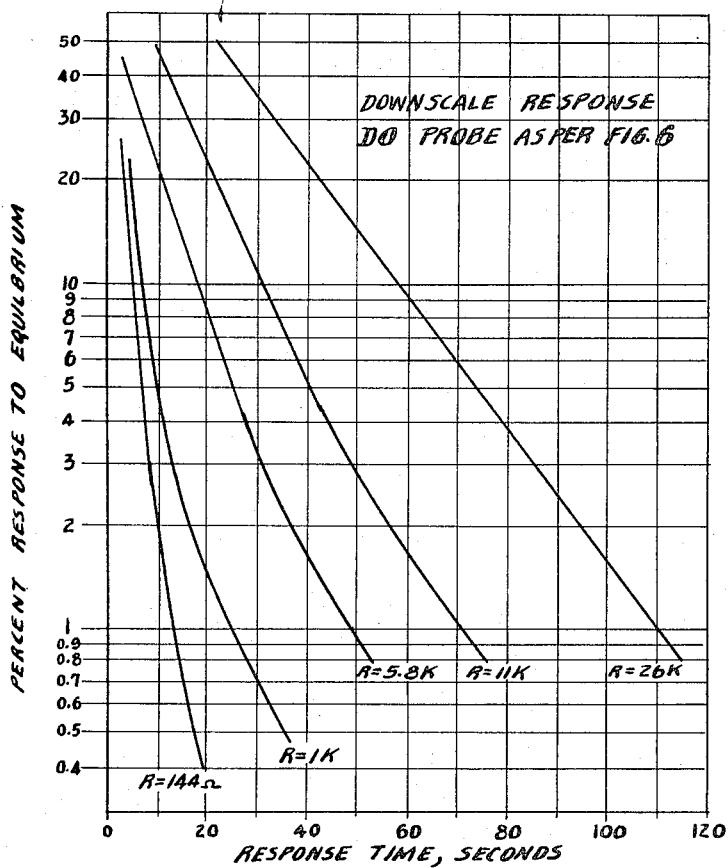
FIGS. 7 and 8 are graphs illustrating the effect of circuit resistance on probe response.

Referring now to the drawings, the preferred form of probe assembly comprises a probe body 10 and a jack housing 11, both of which are formed preferably of a chemical resistant plastic such as polyvinylchloride. The probe body 10 is provided with a cavity 12 having an upper chamber 14 for receiving the lead rod 15 which functions as the anode, and a lower chamber 16 of smaller diameter which extends downwardly toward the rounded tip 17 of the probe. As mentioned later, chambers 16 and 14 are filled with an electrolyte. The lower chamber 16 is provided with four radial passages, at 90° spacings. These passages, which are identified comprehensively by the reference numeral 18, extend from the lower chamber 16 to the external surface of the body probe communication between the electrolyte in the chamber 16 and the electrolyte on the external surface of the probe inside a semipermeable membrane 22 mentioned below.

A curved platinum tip 21 is secured to the external surface of the tip 17 of the probe body, and functions as the cathode of the probe assembly. The plastic membrane 22 is permeable to oxygen and other dissolved gases but impervious to the other constituents of the water or other liquid 20 which is to be analyzed. Membrane 22 is placed around the tip end of the probe so as to fit tightly but not so tightly as to prevent an electrolyte path from the cathode to radial passages 18. Membrane 22 may preferably be Teflon, but may be polyethylene or other suitable material.

The cavity 12 of the probe body is filled completely with an electrolyte, preferably potassium iodide. Additional electrolyte may be added through the threaded port hole 23 as needed. Port hole 23 is closed normally by a nylon screw 24.

The lead rod anode 15 comprises a helical coil 15a and rod 15b supported in dependent position from a stepped circular lead disc 15c which rests on and is supported by an annular lead ring 25 which rests on and is supported by shoulders 26 provided in the body of the probe.

Rotation of lead ring 25 is prevented by an integral stud 25a which projects downwardly from the lead ring 25 and fits into and is cemented into an axial hole 25b provided in the probe body for receiving the stud. Axial hole 25b joins with a radial passage 34 which extends from the upper chamber 14 through the stud body toward the jack housing 11.

The upper end portion of the probe body is internally threaded, as at 27, for receiving a cap screw 28. For sealing the internal cavity 12 and preventing the escape of electrolyte, the cap screw 28 is provided with an O-ring seal 28a and a gasket 29 is inserted between the lead disc 15c and the cap screw 28.

The tip end of the probe body is provided with four axial holes 31a, 31b, 31c and 31d, at 90° spacing located midway between the four radial passages 18, as best seen in FIG. 5. Three of these holes, shown dotted in FIG. 5, are of short depth, but the fourth, hole 31a, shown in solid line in FIG. 5, is of considerably greater depth and extends all the way up the probe body to the first shoulder 32 at which point it joins with a slot 33 in the probe body which extends up the probe body and joins with radial passage 34.

The curved platinum cathode 21 is secured to the tip of the probe by the platinum material and suitable cement which enters into the holes 31a, 31b, 31c, 31d, and by the electrical conductor 35 and suitable cement which is secured to the platinum cathode in hole 31a. Conductor 35 extends up the hole 31a, up the slot 33, and through the radial passage 34 to the switch assembly, indicated generally by the reference numeral 36, located in the jack housing 11 which is secured by cement to the probe body.

A second conductor 37 also extends from the lead anode assembly 15 via the stud 25a of the lead ring 25, through the radial passage 34 to the switch assembly 36. An electrical cable 38, having a sleeve 39 at the jack housing, extends from the switch assembly 36 to the external electrical circuit components, which in a typical case may include a microammeter. The dotted line 42 represents the jack opening for the jack (not shown) which connects the thermistor (FIG. 6) into the feed back circuit of the differential amplifier.

After assembly all conductors are imbedded in a suitable cement.

Switch assembly 36 fits into a cylindrical cavity 36a in the jack housing 11. The cavity 36a is closed by a cap 40 equipped with an O-ring seal 41.

In one preferred form of probe, having a construction similar to that illustrated in the drawings and described above, the area of the helical-rod lead anode was 4.95 square inches, and utilized 4.8 milliliters of potassium iodide electrolyte. Thus, the lead-electrolyte ratio was 1.03. The electrolyte was formed by a solution of 50 grams of potassium iodide plus 100 milliliters of distilled water. The concentrated electrolyte has the advantage of providing superior downscale response.

The surface area of the platinum cathode was 0.155 square inch, so that the lead-platinum ratio was 31.9. This large lead-platinum ratio achieved a probe life of more than ten weeks.

The advantages of the new dissolved oxygen probe have already been set forth hereinabove, and will merely be summarized here. First, the use of lead as an anode instead of silver provides zero probe output at all ages of the probe when the sample contains zero dissolved oxygen. If a silver anode is used, the probe output is not zero at all ages of the probe when the sample contains zero dissolved oxygen. Second, the galvanic potential produced by the probe is approximately 0.5 volt and is adequate for the polarographic determination of dissolved oxygen without need for employing an external voltage source. Third, the employment of a large area of lead anode relative to the area of platinum cathode provides a long and stable performance life, while the relative larger ratio of lead anode area to quantity of concentrated electrolyte provided good downscale response as well as good upscale response. Fourth, the use of potassium iodide (instead of potassium hydroxide, sodium sulphate, potassium chloride, sodium bicarbonate, and others) provides better solubility at 0° C. Thus, the electrolyte remains in solution at cold temperatures and the plastic oxygen-permeable membrane is not damaged by growth of salt crystals. Fifth, the use of potassium iodide provides a probe having the best response rate and the longest life. Sixth, the use of a curved platinum cathode eliminates the "drum" effect which would otherwise cause oscillations in readout when turbulence moved the membrane at a flat cathode surface. Also, by keeping the membrane drawn closely to the curved platinum surface, an improved response rate is obtained. Seventh, the response or output of the platinum-lead probe varies with temperature along a smooth curve making it possible to compensate for such temperature variations by use of a single thermistor in the feedback circuit of an operational amplifier. Prior art probes, not having a smooth response-temperature curve, are not adapted to be accurately compensated except by two or more thermistors.

The output of the new probe may be read as microamperes by means of suitable and conventional readout circuitry, or, when the output is electronically compensated for effects of temperature on probe output, as by a thermistor, the readout scale can be calibrated in p.p.m. (parts per million) of dissolved oxygen.

FIG. 6 illustrates a suitable readout circuit in which the electrodes of the dissolved oxygen probe are shunted by a resistance R, in which the output of the probe is developed by a differential amplifier, and in which the differential amplifier is shunted by a thermistor to effect temperature compensation.

A significant factor in the readout circuitry is that performance of the dissolved oxygen probe can be altered by selection of the resistance R (FIG. 6) which is placed between cathode and anode of the probe. Variation in this resistance R influences: (1) the rate of response of the probe to changes in dissolved oxygen concentration; (2) the amount of physically produced noise in the probe output; and (3) the sensitivity of the probe to turbulence.

Figure 8:
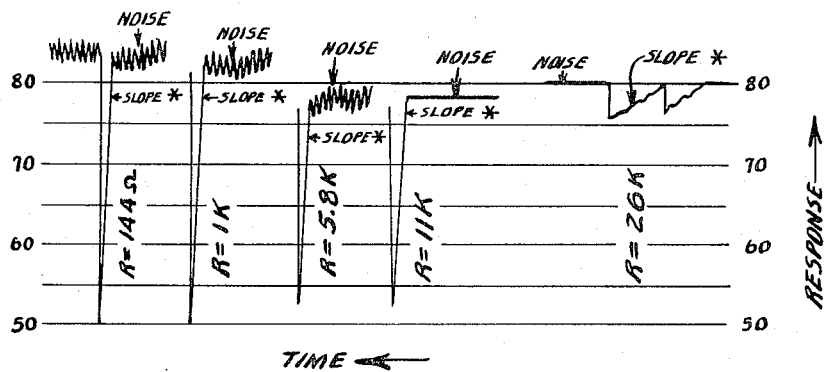

The effect of the circuit resistance R (FIG. 6) on probe response is presented in FIGURE 7. Supporting data for physically produced noise and turbulence response are presented in FIGURE No. 8. At each value of R, the scale span on the recorder was adjusted so that output calibration was constant. Noise in the readout is significant when the circuit resistance R is less than 10 thousand ohms and is less significant when the circuit resistance R is 10 thousand ohms or greater. Also, at higher resistances, the probe is less senstive to turbulence in the sample. That is, at lower circuit resistance a high degree of turbulence is required before an equilibrium output by the probe is obtained. At higher circuit resistances, turbulence is less important in obtaining an equilibrum output from the probe. The slope of the rght side of the down peak in FIG. 8 is the decrease in probe output when agitation of the sample was stopped.

While the preferred embodiment of this invention has been described in some detail, it will be obvious to one skilled in the art that various modifications may be made without departing from the invention as hereinafter claimed.

What is claimed is:

1. A dissolved oxygen probe comprising: an elongated body of chemical resistant material; a cavity in said body adapted to contain an electrolyte; a platinum cathode secured externally at the lower end of said body; a lead anode supported in said cavity and having a surface area at least thirty times that of the said platinum cathode; a lateral passage in said body for providing communication for electrolyte between said cavity and said platinum cathode; a membrane, selectively permeable by oxygen but impermeable by the electrolyte, covering said platinum cathode; and electrical circuit means coupled between said lead anode and platinum cathode, said electrical circuit means including a shunt temperature-insensitive resistance connected between the platinum cathode and lead anode for developing a voltage thereacross, the value of said resistance determining the response rate of the probe.

2. Apparatus according to claim 1 characterized in that said lateral passage extends radially through said body above said platinum cathode, and in that said membrane also covers the exit end of said passage.

3. Apparatus according to claim 2 characterized in the provision of a differential amplifier having input and output terminals; means for applying the voltage developed across said resistance to the input terminals of said differential amplifier; and a feedback circuit, including a series temperature-sensitive resistor, connecting the output and input terminals of said differential amplifier for controlling the gain of said amplifier in accordance with temperature variations.

4. Apparatus according to claim 2 characterized in that an electrolyte is contained in said cavity and in contact with both said anode and said cathode, and in that said electrolyte is potassium iodide.

5. Apparatus according to claim 4 characterized in that the relationship of square inches of lead anode to milliliters of electrolyte is at least one.

6. Apparatus according to claim 1 characterized in that said resistance is of sufficiently high value to reduce the sensitivity of the probe to turbulence and sufficiently low to provide rapid response.

7. Apparatus according to claim 1 characterized in the provision of a differential amplifier having input and output terminals; means for applying the voltage developed across said resistance to the input terminals of said differential amplifier; and a feedback circuit, including a series temperature-sensitive resistor, connecting the output and input terminals of said differential amplifier for controlling the gain of said amplifier in accordance with temperature variations.

8. Apparatus according to claim 1 characterized in that an electrolyte is contained in said cavity and in contact with both said anode and said cathode, and in that said electrolyte is potassium iodide.

References Cited

UNITED STATES PATENTS

| | | | |
|---|---|---|---|
| 2,910,420 | 10/1959 | Preiser | 204—195 |
| 3,000,805 | 9/1961 | Carritt et al. | 204—195 |
| 3,098,813 | 7/1963 | Beebe et al. | 204—195 |
| 3,227,643 | 1/1966 | Okun et al. | 204—195 |
| 3,239,444 | 3/1966 | Heldenbrand | 204—195 |
| 3,278,408 | 10/1966 | Leonard et al. | 204—195 |
| 3,322,662 | 5/1967 | Mackereth | 204—195 |

HOWARD S. WILLIAMS, *Primary Examiner.*

ROBERT K. MIHALEK, *Examiner.*

T. TUNG, *Assistant Examiner.*